Oct. 23, 1962     K. G. HUNTLEY     3,060,382
POLARIZED RELAY DEVICE

Filed Oct. 24, 1958                           4 Sheets-Sheet 1

INPUT-OUTPUT TRANSFER CHARACTERISTIC OF FIG. 5.

INVENTOR
Keith Gordon Huntley
BY Pierce, Schiffler & Parker
ATTORNEYS

Oct. 23, 1962 K. G. HUNTLEY 3,060,382
POLARIZED RELAY DEVICE
Filed Oct. 24, 1958 4 Sheets-Sheet 3

INPUT-OUTPUT TRANSFER CHARACTERISTIC
OF FIG. 4 INVERTED

INVENTOR
Keith Gordon Huntley
BY Pierce, Scheffler & Parker
ATTORNEYS

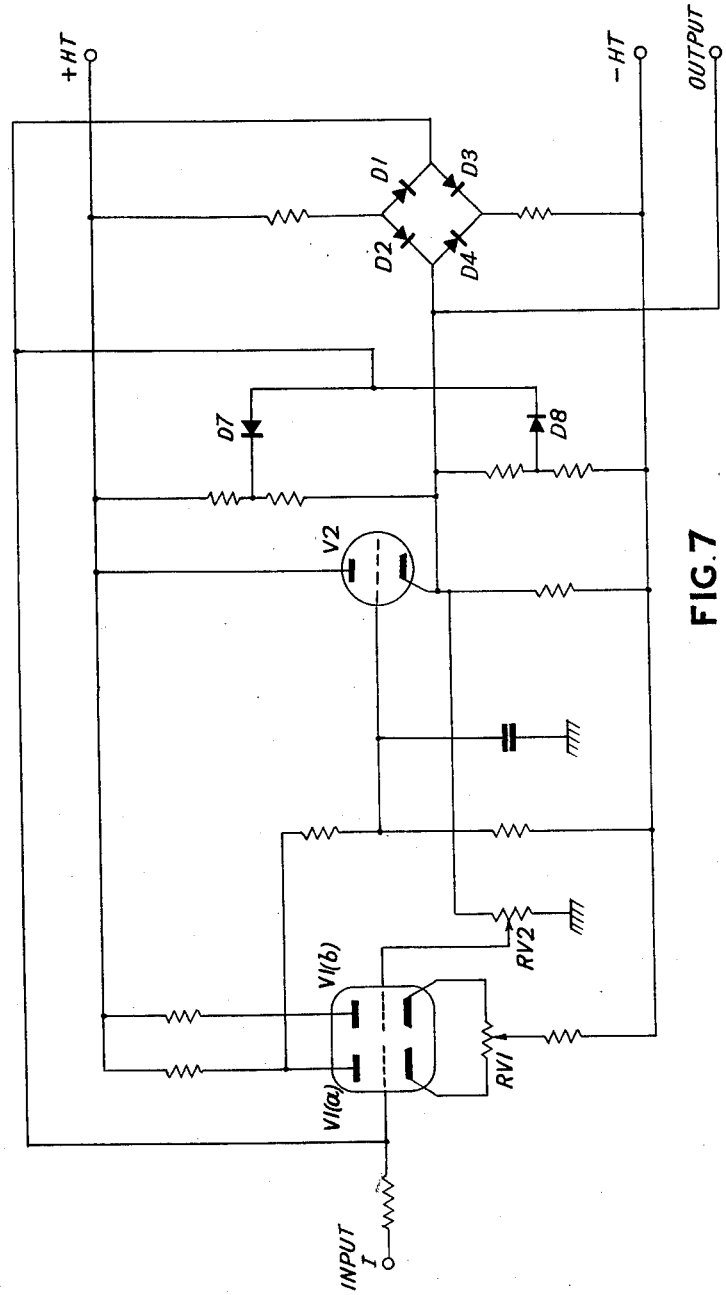

United States Patent Office 3,060,382
Patented Oct. 23, 1962

3,060,382
POLARIZED RELAY DEVICE
Keith Gordon Huntley, Hillbrook, The Uplands, Dukeswood, Gerrard Cross, England, assignor to Rank Precision Industries, Ltd., London, England, a British company
Filed Oct. 24, 1958, Ser. No. 769,497
17 Claims. (Cl. 328—85)

This invention is concerned with electronic relay devices especially suitable for automatic controls, such as those used in the control of industrial machines and processes.

The objects and advantages of the present invention will become apparent in the light of the following specification when considered in conjunction with the accompanying drawings in which:

FIG. 7 is a circuit diagram of the preferred form of controller circuit of FIG. 5 making use of electron tubes.

Figure 1:
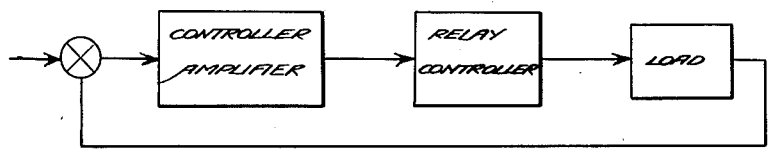
FIG. 1 is a block diagram of a simple known type of relay servo mechanism having an on-off controller.
Figure 2:
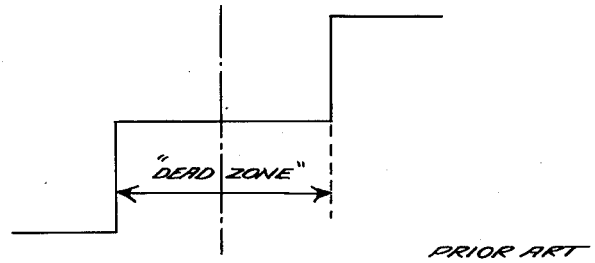
FIG. 2 is a characteristic curve of the relay controller circuit of FIG. 1.

It is well known in the art to use an on/off controller in the servo mechanism and such systems are usually known as "relay servos." The term relay is intended to include any power level switching means producing a predetermined output for given input conditions. The term must not be therefore restricted to electromagnetic relay devices of the type for instance employed in the art of telephony. FIGURE 1 is a diagram of a simple relay servo mechanism of this type in which the relay controller may comprise a simple electromagnetic relay, or switched magnetic amplifiers incorporating saturable reactors, or thyratrons, the relay controller being preceded by a suitable non-linear amplifier. Where a simple electromagnetic relay is used, the "pull in" and "drop out" currents will be different and in general a greater current will be required to operate the relay than to release it. The reliability of a simple relay is not satisfactory for industrial operations in which the relay may be operated many times a day, and a magnetic amplifier or a thyratron is to be preferred in which case a relay controller having a circuit with a characteristic as illustrated in FIGURE 2 is required. In FIGURE 2 it will be noted that there is a region of input over which the output of the relay controller is zero, thus providing a "dead zone" in the servo loop to maintain the required degree of stability. The provision of a "dead zone" according to FIG. 2 is, of course, well known in the art, its specific purpose being to prevent instability or fast "hunting."

Where a relay servo mechanism is used for continuous control of a process, it is found in practice that the relay controller hunts around or near the extremities of the dead zone according to the general direction of the changes being corrected. It will be appreciated that in the control of a machine or process, the response to steady state changes is more important than response to transient changes as the principal objective is to correct slow drifts in the process, or in the machine setting.

It would be desirable therefore to ensure that the error recedes well within the dead zone before correction action is terminated. Furthermore since the actual requirements vary from installation to installation, controllability of the drop out, i.e. substantially zero output from the controller, is another desirable feature.

The above dead zone characteristics while particularly useful in connection with servo mechanism controllers, are also applicable to general controllers not necessarily in a servo loop configuration.

It should be observed however that in some applications the speed of response must be better than can possibly be achieved, for instance, by an electromagnetic relay type of controller.

One of the objects of the present invention is, therefore, a quick-acting all-electronic polarized switch having a dead zone and ensuring a drop out within the said dead zone, the limits of the dead zone and the drop out point being controllable by electronic means to suit the specific requirements of the apparatus to which said electronic switch is applied.

It is another object of the present invention to provide an electronic switch as defined which is particularly suitable for use as a controller in a servo mechanism configuration.

Figure 3:
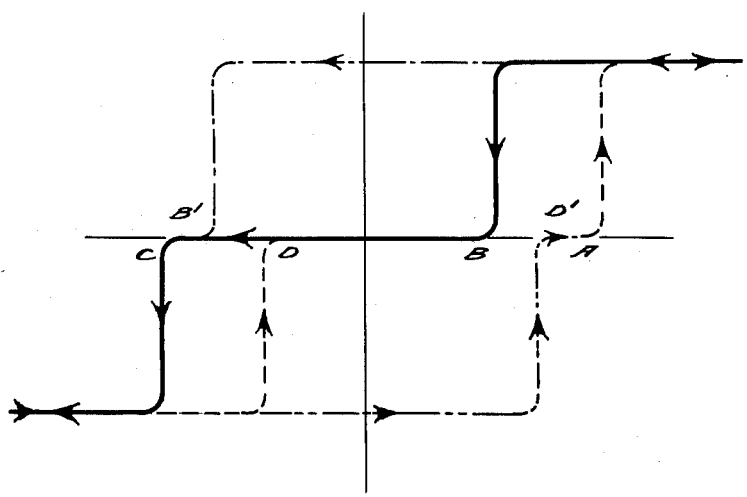
FIG. 3 is a characteristic curve of a relay controller circuit according to the present invention.

FIGURE 3 shows the characteristic which is required to realize the above desired features.

The present invention may be used with advantage in connection with many industrial processes and machines, for example for the supervision and control of the spacing and operation of the rolls in rolling mills and for regulating the operation of processes, for example in the manufacture of blending of liquid products of various kinds. The invention may be used with special advantage for the control of continuous processes where certain elements have upper and lower limits between which they must be maintained.

Let it now be assumed that a relay controller in a servo control mechanism according to the invention be operating an electric motor or drive (not shown), then the motor will be switched on at point "A" (FIGURE 3) to correct an error which has developed in a machine or process, but will not be switched off until the error has been reduced to "B." With the circuit to be proposed for obtaining the characteristic shown in FIGURE 3, point "B" may, in fact, be adjusted to occur over a wide range and may for example be as shown at "B'."
It will be noted that the proposed characteristic of the amplifier for the input to the controller is symmetrical and provides a negative output for negative errors where points "C" and "D" correspond to "A" and "B" respectively.

Figure 4:
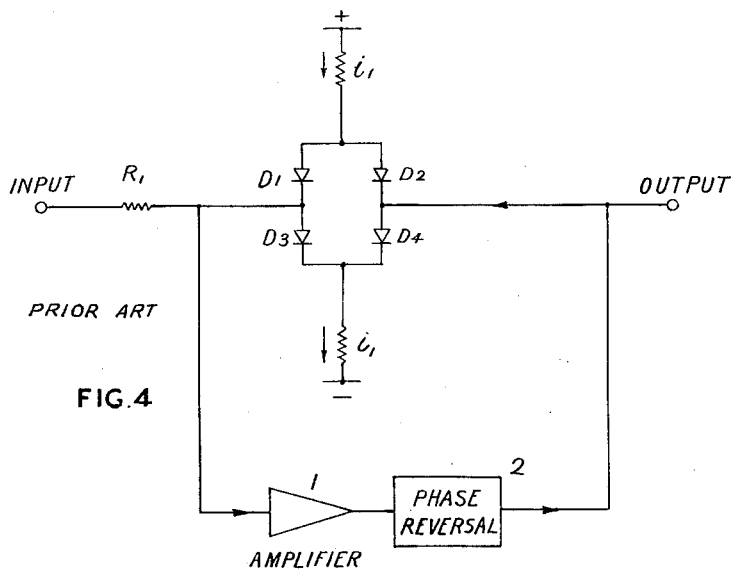
FIG. 4 is a schematic diagram of a controller circuit for achieving the characteristic curve of FIG. 2.
Figure 5:
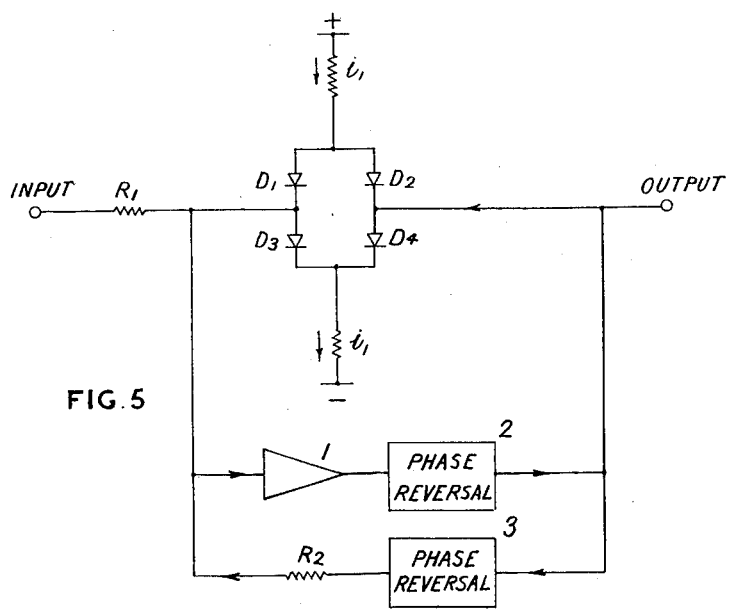
FIG. 5 is a schematic diagram of a controller circuit for realizing the characteristic of FIG. 3.

FIG. 4 is a partly functional illustration of a controller for realizing the characteristic of FIG. 2, and is intended to be an introduction to FIG. 5 which is the basic functional diagram of the invention. In FIGURE 4, a "see-saw" circuit is provided with a diode bridge limiting circuit in the feed back loop. Thus when the current through an input resistor R1 exceeds the the direct current $i_1$ in the bridge circuit, diodes D1 and D4 become non-conductive and, as a result, the feed back loop is broken. The action so far described is for a positive input, but the circuit acts similarly for a negative input, when the diodes D2 and D3 become nonconducting.

FIGURE 5 shows in schematic form a controller circuit embodying the present invention, and it will be noted that in addition to the arrangement shown in FIGURE 4, the circuit has a positive feed back loop via a phase reversal unit 3 and a feed back resistor R2. Thus when point "A" or point "C,'" for example, on the characteristic shown in FIGURE 3 is reached, the diode bridge circuit D1–D4 inclusive become non-conducting and, due to the positive feed back loop via resistor R2, a regenerative action occurs until the amplifier (1) limits. The circuit will now remain in this state until the input current through resistor R1 has been sufficiently reduced to overcome the "bias" current provided through resistor R2 and clearly, by suitable adjustment of resistor R2, the position of point "B" or point "D" in FIGURE 3 may be chosen.

There are many practical ways of realizing the characteristics of FIG. 3 according to the functional diagram of FIG. 5.

Figure 8:
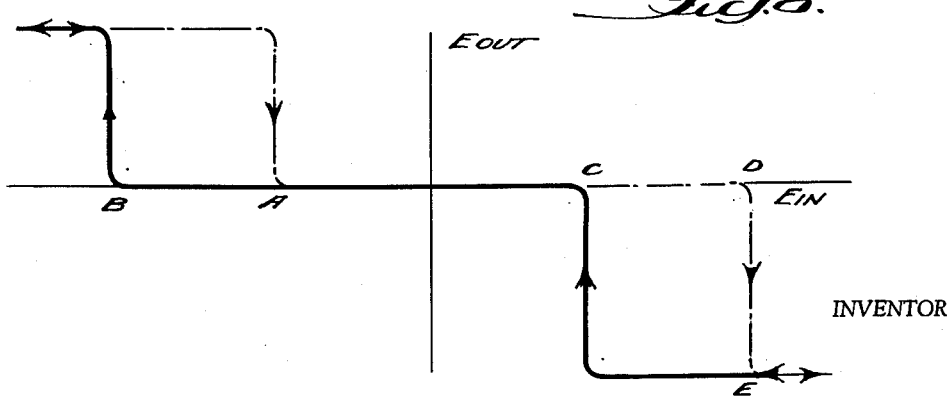
FIG. 8 illustrates an inverted input/output characteristic similar to that of FIG. 4.

FIG. 8 shows the input/output characteristic of FIG. 4 inverted and corresponds to the characteristics of the circuit arrangement in FIG. 5 as will now be shown. E-in and E-out are the potentials at the terminals marked "INPUT" and "OUTPUT" respectively.

Consider an initial condition in which E-in=O.V. Diodes $D_1$, $D_2$, $D_3$ and $D_4$ will all be conducting and there will be negative feedback from 2 to the "virtual earth" at the junction $R_1$, $R_2$, $D_1$, $D_3$. Provided there is no zero error in the amplifier 1 or the diode bridge, E-out will also be at zero potential. The output from 3 will also be zero and no current flows through $R_2$.

The gain of the circuit, due to feedback via the diode bridge, will be very small and for excursions of E-in within the "dead zone" E-out will remain substantially zero.

If E-in is now increased in a positive direction a current passes from the source through $R_1$, $D_1$ and $D_3$. When $$\frac{E\text{-in}}{R_1}=i_1$$

$D_1$ and $D_4$ become non-conducting and the negative feedback loop is broken. This corresponds to point "D" in the characteristic. A further slight increase in E-in causes a positive increase in potential at the input to 1 and a negative change in E-out. Due to the positive feedback via 3 and $R_2$ the action is regenerative and E-out rapidly changes to its most negative condition (determined by the dynamic limit of the characteristic of 1 and 2). The operating point is now at "E" in FIG. 8.

Further increase in E-in produces no change at the output.

Let the current through $R_2$ in this condition be $i_2$. Then as E-in is decreased a point will be reached where $$\frac{E\text{-in}}{R_1}=i_1-i_2$$

and the current into the diode bridge will be $i_1$. A further slight decrease in E-in will, therefore, cause $D_1$ and $D_4$ to become conducting again and negative feedback will be restored. Thus the original condition of E-out 0 obtains. The transient is regenerative due to positive feedback via $R_2$ until such time as the impedance of the diode bridge becomes less than $R_2$.

Operation for negative excursions of E-in is similar.

Figure 6:
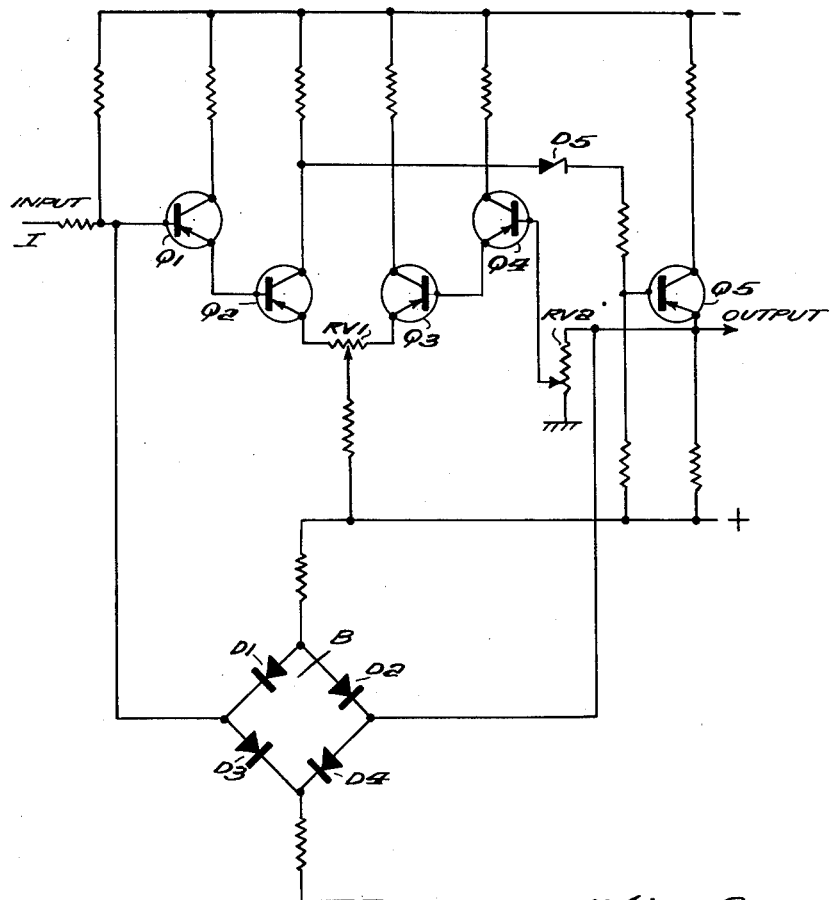
FIG. 6 is a circuit diagram of the preferred form of controller circuit of FIG. 5 making use of transistors.

A circuit diagram is given in FIGURE 6 showing a preferred lay-out in accordance with the schematic form of controller illustrated in FIGURE 5. This lay-out makes use of transistors but it will be well understood that a circuit may be employed using valves instead of transistors as illustrated in FIGURE 7.

In FIGURE 6 the INPUT at I corresponds to the INPUT in FIGURE 5, and the circuit includes five transistors Q1, Q2, Q3, Q4 and Q5. Transistor Q1 is an emitter follower whose function is to lower the impedance and Q2 is a phase-reversing amplifier. Transistors Q3 and Q4 form a positive feedback loop from the output, and transistor Q5 is another emitter follower forming the output stage of the circuit.

Transistor Q2 leads to a diode D5 which is a Zener diode and which serves as a direct current coupling to change the voltage level so that transistor Q5, which follows in the circuit, is brought back to the input level. In this connection, it should be noted that the operating characteristics of transistor Q2 are such as to require a higher power operating level than the input source can normally supply.

The operating conditions of transistor Q2 are such that controlled limiting occurs in both the positive and the negative output directions. Controlled limiting is necessary to define accurately, together with variable resistance $RV_2$, the overlap of FIGURE 3.

Transistors Q1 and Q2, diode D5 and transistor Q5 form the forward amplifier loop corresponding to the amplifier 1 in FIGURES 4 and 5.

A resistance $RV_2$ corresponds to resistor R2 in FIGURE 5 and is used to adjust the overlap in the range B'—D' of FIGURE 3 while the purpose of another resistance RV1 is to ensure constant zero output in the dead zone. A bridge B comprising the diodes D1, D2, D3, D4 corresponds to the bridge illustrated in FIGURES 4 and 5. FIGURE 7 illustrates a circuit arrangement using valves instead of transistors, and the same references have been used in FIGURE 7 as in FIGURE 6.

In FIGURE 7, all elements which are numbered identically to similar elements in FIGURE 6 perform the same function. In addition, valve V1 (a) replaces transistors Q1 and Q2, valve V1 (b) replaces transistors Q3 and Q4 whilst diode D5 of FIGURE 6 is not required. In FIGURE 7, the diodes D7 and D8 perform the controlled limiting function which in FIGURE 6 is achieved by the design of the output stage. In all other respects, the circuit arrangement of FIGURE 7 operates in the same manner as that of FIGURE 6.

Operation of FIGS. 6 and 7 is in all ways similar to FIG. 5 except that positive feedback is obtained by voltage addition in the first stage of the amplifier instead of current addition ($i_2$) previously described. Also, in FIG. 7 the limit conditions are set by diodes $D_7$ and $D_8$. One or other of these diodes becomes conducting at maximum positive or negative output reclosing the negative feedback loop and providing limiting by virtue of a large reduction in gain.

Considering, for example, FIG. 7 as before, within the "dead zone" the output potential is substantially zero. As E-in is increased positively the current through $D_3$ and $D_2$ increases and the current through $D_1$ and $D_4$ decreases until $D_1$ and $D_4$ become non-conducting. A further slight increase in E-in causes a regenerative action via the positive feedback path (RV2) leaving VI (b) OFF and the whole of the common cathode current of VI passes through VI(a). According to the setting of RV2 the grid of VI(b) will be at some negative potential (say $-Eg2$). As E-in is again reduced towards zero, return to the "dead zone" will be delayed until the potential at the grid of VI(a) approaches $-Eg2$. This produces the desired characteristic. The operation of FIG. 6 follows logically from FIG. 7.

While in accordance with the patent statutes I have illustrated and described the best form and embodiments of my invention now known to me, it will become apparent to those skilled in the art that other changes and embodiments might be made without deviating from the scope of the invention as defined in the following claims.

I claim:

1. A polarized electronic relay comprising an input and an output, electronic means for amplifying an input signal and yielding a corresponding output signal in phase opposition thereto, a negative feed-back loop between said output and said input, said negative feedback loop comprising electronic switching means enabling substantially 100% negative feed back within predetermined excursions of the input signal in a negative and positive direction from a predetermined datum level, said switching means causing the negative feed-back loop to be broken when said excursions are exceeded, said electronic relay providing substantially zero output when said negative feed-back loop is operative and a limit output level when said loop is broken, a positive feed-back loop between said output and said input, whereby upon the negative feed-back loop being broken regenerative action takes place until the means for amplifying the input signal produce said limit output level, said positive feed-back loop producing in effect a bias below the value of which the input signal must fall before the negative feed back loop becomes operative.

2. A polarized electronic relay as claimed in claim 1, wherein said bias is determined by the value of a resistor in said positive feed-back loop.

3. A polarized electronic relay as claimed in claim 2, wherein said resistor is variable for the purpose of adjusting at will the value to which the input signal must fall for establishing substantially zero output from the relay.

4. A polarized electronic relay comprising input and output means, means including an amplifier with negative feed-back extended through a limiting diode bridge for ensuring datum-level output within two predetermined limits of input signal to thus define the "dead zone" of the relay, means including a positive feed-back loop in said amplifier for regeneratively causing pull-in as one limit is exceeded and for regeneratively causing drop-out when the signal recedes to well below said one limit, and bias means for adjusting the drop-out within the limits of the dead zone without affecting said limits.

5. A polarized electronic relay comprising input means including first and second electron tube means, output means including third electron tube means, a diode limiting bridge operative between said third and said first electron tube means to provide substantially 100% negative feed-back corresponding to datum-level relay output until predetermined upper or lower limits of the bridge are exceeded by an input signal, the region of datum-level output constituting the dead zone of the relay, positive feed-back means from said third to said second electron tube means, said positive feed-back means being operative to regeneratively switch said second electron tube means toward cut-off and said first electron tube means toward limiting output when one of said limits is exceeded and vice-versa when the other of said limits is exceeded, and means for extending the output of said first electron tube means to the input of said third electron tube means.

6. A polarized electronic relay as defined in claim 5, wherein said first electron tube means and said second electron tube means are included in a circuit for adjusting the datum level of the relay.

7. A polarized electronic relay as defined in claim 5, wherein variable bias means are provided in said positive feed-back means to adjust the drop-out point of the relay within the dead zone.

8. A polarized electronic relay as defined in claim 6, wherein variable bias means are provided in said positive feed-back means to adjust the drop-out point of the relay within the dead zone.

9. A polarized electronic relay comprising input means including first and second transistor means, output means including third transistor means, a diode limiting bridge operative between said output means and said input means to provide substantially 100% negative feed back corresponding to datum-level relay output until predetermined upper and lower limits of the bridge are exceeded by an input signal, the region of datum-level output constituting the dead zone of the relay, positive feed-back means from said third transistor means to said second transistor means for regeneratively switching said second transistor means towards cut-off and said first transistor means towards limiting output when one of said limits is exceeded and vice-versa when the other of said limits is exceeded and means for extending the output of said first transistor means to the input of said third transistor means.

10. A polarized electronic relay as defined in claim 9, wherein said first transistor means and said second transistor means are included in a circuit for adjusting the datum level output of the relay.

11. A polarized electronic relay as claimed in claim 9, wherein variable bias means are provided in said positive feed-back means to adjust the drop-out point of the relay within the dead zone.

12. A polarized electronic relay as claimed in claim 10, wherein variable bias means are provided in said positive feed-back means to adjust the drop-out point of the relay within the dead zone.

13. A polarized electronic relay comprising input and output means, means for ensuring datum level output between an upper predetermined limit and a lower predetermined limit of input signal to thus define the "dead zone" of the relay, and means for regeneratively causing pull-in towards a predetermined output above or below the datum level output as one or other limit is exceeded and for regeneratively causing drop-out into the datum level output when the input signal recedes to well within the dead zone.

14. A polarized electronic relay as claimed in claim 13, wherein means are included for adjusting the actual drop-out points within the dead zone without affecting the set limits of the dead zone.

15. A polarized electronic relay comprising input and output means, means including an amplifier having negative feed-back means including a feed-back limiter for ensuring datum level output between an upper predetermined limit and a lower predetermined limit of input signal to thus define the dead zone of the relay, and means including a positive feed-back loop in said amplifier for regeneratively causing pull-in towards a predetermined output above or below the datum level output as one or other limit is exceeded and for regeneratively causing drop-out into the datum output level when the input signal recedes to well within the dead zone.

16. A polarized electronic relay as claimed in claim 13 wherein means are included for adjusting the actual drop-out points within the dead zone without affecting the set limits of the dead zone.

17. A polarized electronic relay as claimed in claim 15, wherein said predetermined output is a limiting output.

References Cited in the file of this patent

UNITED STATES PATENTS

| | | |
|---|---|---|
| 2,398,421 | Frische et al. | Apr. 16, 1946 |
| 2,493,772 | McCoy et al. | Jan. 10, 1950 |
| 2,515,771 | Hall | July 18, 1950 |
| 2,534,801 | Siltamaki | Dec. 19, 1950 |
| 2,559,266 | Wannamaker | July 3, 1951 |
| 2,592,770 | Waldie et al. | Apr. 15, 1952 |
| 2,830,024 | Darling | Apr. 8, 1958 |

UNITED STATES PATENT OFFICE
CERTIFICATE OF CORRECTION

Patent No. 3,060,382            October 23, 1962

Keith Gordon Huntley

It is hereby certified that error appears in the above numbered patent requiring correction and that the said Letters Patent should read as corrected below.

Column 6, line 49, for the claim reference numeral "13" read -- 15 --.

Signed and sealed this 19th day of March 1963.

(SEAL)
Attest:

ESTON G. JOHNSON            DAVID L. LADD

Attesting Officer            Commissioner of Patents